United States Patent [19]

Shiraishi et al.

[11] Patent Number: 5,054,568
[45] Date of Patent: Oct. 8, 1991

[54] AUXILIARY STEERING CONTROL APPARATUS

[75] Inventors: Yasuhiro Shiraishi, Atsugi City; Yasuki Ishikawa, Sagamihara, both of Japan

[73] Assignee: Nissan Motor Co., Ltd., Yokohama, Japan

[21] Appl. No.: 518,727

[22] Filed: May 3, 1990

[30] Foreign Application Priority Data

May 18, 1989 [JP] Japan .................................. 1-124973

[51] Int. Cl.⁵ ........................... B62D 5/06; B62D 7/06
[52] U.S. Cl. ..................................... 180/140; 180/142; 280/91; 364/424.05
[58] Field of Search ............... 180/140, 141, 142, 143, 180/79.1; 280/91; 364/424.05

[56] References Cited

U.S. PATENT DOCUMENTS

| | | | |
|---|---|---|---|
| 4,412,594 | 11/1983 | Furukawa et al. | 180/142 X |
| 4,687,214 | 8/1987 | Uno | 280/91 |
| 4,705,135 | 11/1987 | Kawamoto et al. | 364/424.05 X |
| 4,706,976 | 11/1987 | Kawamoto et al. | 280/91 |
| 4,716,981 | 1/1988 | Murao | 180/140 X |
| 4,947,327 | 8/1990 | Kawagoe | 364/424.05 |

FOREIGN PATENT DOCUMENTS

| | | |
|---|---|---|
| 311098 | 4/1989 | European Pat. Off. . |
| 61-175183 | 8/1986 | Japan . |
| 152975 | 7/1987 | Japan ................................. 180/140 |
| 160963 | 7/1987 | Japan ................................. 180/141 |
| 2186244 | 8/1987 | United Kingdom . |

*Primary Examiner*—Kenneth R. Rice
*Assistant Examiner*—Kevin Hurley
*Attorney, Agent, or Firm*—Foley & Lardner

[57] ABSTRACT

An auxiliary steering control apparatus for use with a motor vehicle having a vehicle speed sensor sensitive to a vehicle speed. A control unit is coupled to the vehicle speed sensor for sampling the sensed vehicle speed at time intervals and calculating a vehicle speed change between a new value of the sensed vehicle speed and the last value of the sensed vehicle speed. The control unit calculates a control vehicle speed value which is equal to the new vehicle speed value when the calculated vehicle speed change is less than a limit value and is equal to the last vehicle speed value plus the limit value when the calculated vehicle speed change exceeds the limit value. The control unit normally performs an auxiliary steering operation to provide an oversteer and understeer characteristic and performs an auxiliary steering operation to provide an understeer characteristic in the presence of a failure signal produced when a difference between the new vehicle speed value and the control vehicle speed value exceeds a predetermined value.

7 Claims, 5 Drawing Sheets

AUXILIARY STEERING CONTROL APPARATUS

BACKGROUND OF THE INVENTION

This invention relates to an auxiliary steering control apparatus for use with a motor vehicle having controllable dynamic characteristics including yaw velocity, side velocity, roll velocity, etc. Although the invention will be described in connection with a rear wheel steering control system, it should be understood that the invention is equally applicable to other vehicle dynamic characteristic systems including active suspension control systems and the like utilizing information on steering wheel position to control the dynamic characteristics of motor vehicles.

For example, U.S. patent application Ser. No. 07/375,629, filed July 6, 1989, discloses a rear wheel steering control apparatus which includes a hydraulic rear wheel steering actuator for controlling the angle of steering of the rear wheels based on the front wheel steering angle and the vehicle speed. The control apparatus calculates a target value for rear wheel steering angle in a manner to provide a first order advance phase inversion control where the rear wheels are turned for a moment in the direction opposite to the direction in which the front wheels are turned and then are turned in the same direction as the front wheel steering direction. When the rear wheels are turned in the direction opposite to the front wheel steering direction, a cornering force is applied in the yaw direction so as to decrease the time required for the yaw rate to increase to a sufficient extent. After a sufficient yaw rate is obtained, the rear wheels are turned in the same direction as the front wheel steering direction so as to limit the yaw rate increase and, thus, decrease the side slip angle. This is effective to increase the steering operation stability and decrease the steering operation response time.

The rear wheel steering control apparatus also includes a cutoff valve which is closed to interrupt the application of working pressure to the rear wheel steering actuator when a failure occurs in the vehicle speed sensor or the circuit associated therewith. After the cutoff valve is closed, the working pressure leaks through the closed cutoff valve to permit the rear wheel steering actuator to avoid a sudden rear wheel position change. If a failure occurs in the vehicle speed sensor or the circuit associated therewith when the rear wheels are steered in the direction opposite to the front wheel steering direction, however, the vehicle tends to spin due to its oversteer characteristic held until the working pressure to the rear wheel steering actuator decreases to zero even if the cutoff valve operates in order.

SUMMARY OF THE INVENTION

Therefore, it is a main object of the invention to provide an improved auxiliary steering control apparatus which can avoid a sudden steering position change and ensure vehicle driving safety when the vehicle turns in a corner when a failure occurs in the associated vehicle speed sensor and the circuit associated therewith.

There is provided, in accordance with the invention, an auxiliary steering control apparatus for use with a motor vehicle having a steering handle operable to provide a driver's vehicle steering demand. The apparatus comprises first sensor means sensitive to a driver's vehicle steering demand, second sensor means sensitive to a vehicle speed, and a control unit coupled to the first and second sensor means. The control unit includes means for sampling the sensed vehicle speed at time intervals, means for calculating a vehicle speed change between a new value of the sensed vehicle speed and the last value of the sensed vehicle speed, means for calculating a control vehicle speed value which is equal to the new vehicle speed value when the calculated vehicle speed change is less than a limit value and is equal to the last vehicle speed value plus the limit value when the calculated vehicle speed change exceeds the limit value, means for producing a failure signal when a difference between the new vehicle speed value and the control vehicle speed value exceeds a predetermined value, means for performing an auxiliary steering operation to provide an oversteer and understeer characteristic when the vehicle moves in a curve in the absence of the failure signal, and means for performing an auxiliary steering operation to provide an understeer characteristic when the vehicle moves in a curve in the presence of the failure signal.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
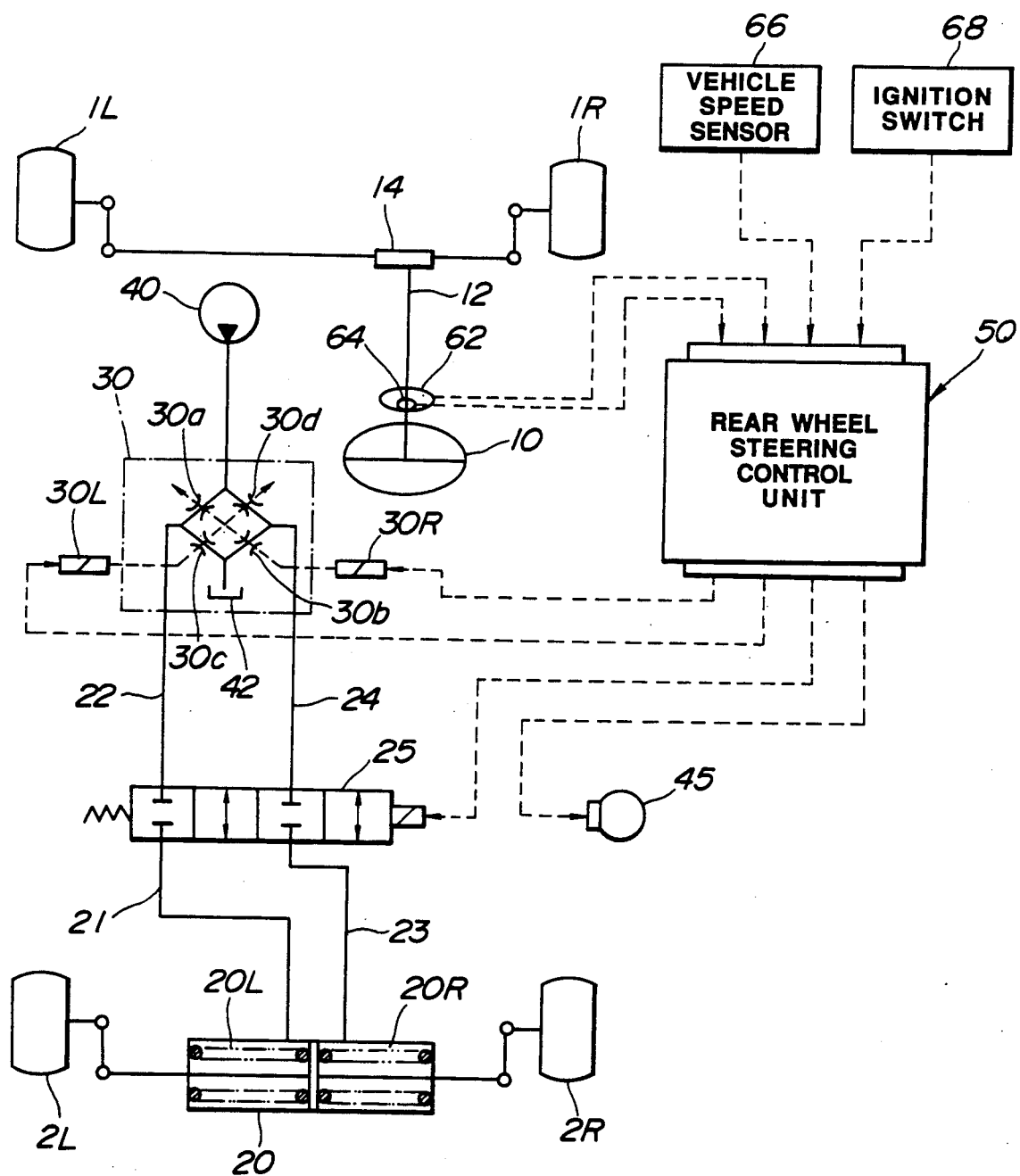
FIG. 1 is a schematic diagram of an auxiliary steering control apparatus embodying the invention.

With reference to the drawings, and in particular to FIG. 1, there is shown a schematic diagram of a steering control system embodying the invention. The steering control system will be described in connection with a four wheel steering type automotive vehicle supported on a pair of steerable front wheels 1L and 1R spaced laterally apart at equal distances from a vehicle longitudinal axis and a pair of steerable rear wheels 2L and 2R spaced laterally apart at equal distances from the vehicle longitudinal axis.

The front wheels 1L and 1R are connected to a steering wheel or handle 10 through a conventional link mechanism including a steering shaft 12 and a steering gear 14. The rear wheels 2L and 2R are associated with a hydraulic actuator 20 of the spring center type having two pressure chambers 20L and 20R for turning the rear wheels 2L and 2R in response to the hydraulic pressure acting in the first or second pressure chamber 20L or 20R. The steering actuator 20 turns the rear wheels 2L and 2R in a counter-clockwise direction at an angle proportional to the hydraulic pressure introduced into the first pressure chamber 20L with respect to the vehicle longitudinal axis and it turns the rear wheels 2L and 2R in the clockwise direction at an angle proportional to the pressure introduced into the second pressure chamber 20R with respect to the vehicle longitudinal axis. The first pressure chamber 20L is connected through a conduit 21 to a cutoff solenoid valve 25 and hence through a conduit 22 to a control valve 30. The second pressure chamber 20R is connected through a conduit 23 to the cutoff solenoid valve 25 and hence through a conduit 24 to the control valve 30.

The cutoff valve 25 is normally in a closed position cutting off communication between the lines 21 and 22 and at the same time cutting off communication between the conduits 23 and 24. The cutoff valve 26 moves to its open position establishing communication between the conduits 21 and 22 and at the same time establishing communication between the lines 23 and 24 in the presence of a drive signal IF in the form of electric current applied thereto from a control unit 50. The control unit 50 interrupts the application of the drive signal IF when the ignition switch 68 is turned off or when trouble occurs in the steering control system.

The control valve 30 has two pairs of variable area orifices connected in a bridge configuration. One pair of orifices 30a and 30b are associated with a solenoid 30R which varies the opening areas of the orifices 30a and 30b as a function of the magnitude of a drive signal IR* in the form of electric current applied thereto from the control unit 50. The orifices 30a and 30b have a maximum opening area in the absence of the drive signal IR*. The other pair of orifices 30c and 30d are associated with a solenoid 30L which varies the opening areas of the orifices 30c and 30d as a function of the magnitude of a drive signal IL* in the form of electric current applied thereto from the control unit 50. The orifices 30c and 30d have a maximum opening area in the absence of the drive signal IL*. The bridge is driven by a hydraulic source which is obtained from an electric pump 40 having its outlet connected to the bridge for supplying hydraulic fluid to the bridge. Excess hydraulic fluid is discharged from the bridge to a reservoir 42.

In the absence of the drive signals IL* and IR*, the orifices 30a, 30b, 30c and 30d are open fully to discharge all of the hydraulic pressure from the electric pump 40 to the reservoir 42. As a result, no hydraulic pressure is supplied to the first and second pressure chambers 20L and 20R. The control valve 30 supplies a hydraulic pressure corresponding to the magnitude of the drive signal IL* or IR* through the cutoff valve 25 to the first or second pressure chamber 20L or 20R of the hydraulic actuator 20.

The steering angle of the rear wheels 2L and 2R, this being determined by the magnitude of the drive signal IL* or IR* applied to the first or second solenoids 30L or 30R, is repetitively determined from calculations performed by the control unit 50, these calculations being based upon various conditions of the automotive vehicle that are sensed during its operation. These sensed conditions include steering wheel position, steering wheel rotating direction, steering wheel neutral position, and vehicle speed. Thus, a steering wheel position sensor 62, a steering wheel neutral position sensor 64 and a vehicle speed sensor 66 are connected to the control unit 50. The numeral 68 designates an ignition switch connected to the control unit 50. When the ignition switch 68 is turned on, energy is supplied to the ignition system and to the control unit 50. The steering wheel position sensor 62, which may be like that disclosed in greater detail in Japanese Patent Application Ser. No. 1-120884, produces an electric signal indicative of a sensed steering wheel position 0. The steering wheel neutral position sensor 64, which may be like that disclosed in greater detail in Japanese Patent Application Ser. No. 1-120884, produces a steering wheel neutral position signal CP having a first level when the sensed steering wheel position is in a predetermined neutral position range and a second level when the sensed steering wheel position is out of the predetermined neutral position range. The vehicle speed sensor 66 is positioned to sense vehicle speed V and it produces an electric signal indicative of a sensed vehicle speed.

Figure 2:
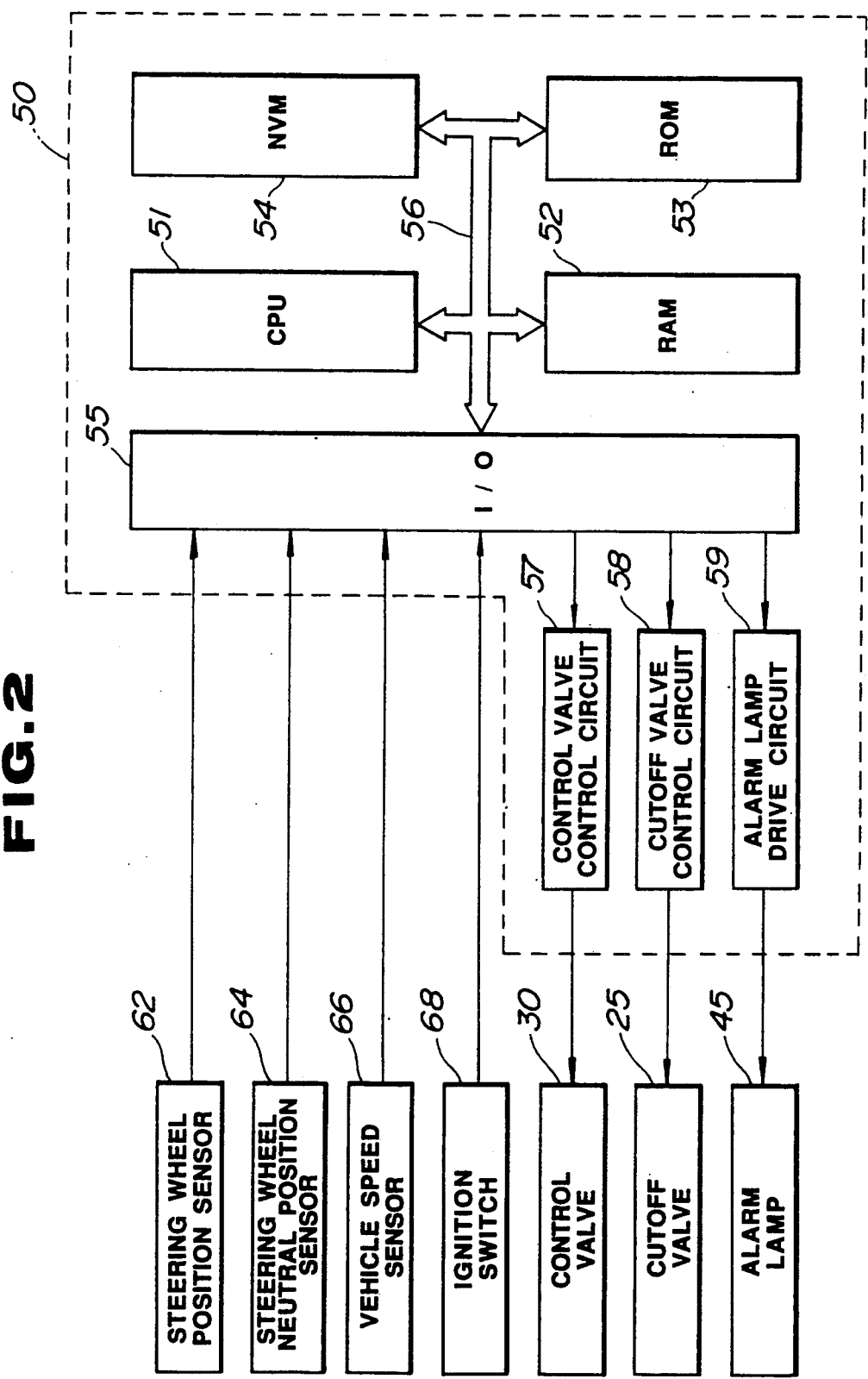
FIG. 2 is a block diagram illustrating the detailed arrangement of the control unit.

Referring to FIG. 2, the control unit 50 employs a digital computer including a central processing unit (CPU) 51, a random access memory (RAM) 52, a read only memory (ROM) 53, a nonvolatile memory (NVM) 54, and an input/output control circuit (I/O) 55. The central processing unit 51 communicates with the rest of the computer via data bus 56. The input/output control circuit 55 includes an analog-to-digital converter and counters. The input/output control unit 55 is connected to the steering wheel position sensor 62, the steering wheel neutral position sensor 64, the vehicle speed sensor 66 and the ignition switch 68 for converting the sensor signals for application to the central processing unit 51. The read only memory 53 contains the programs for operating the central processing unit 51 and further contains appropriate data in look-up tables used in calculating appropriate values for rear wheel steering angle. The look-up table data may be obtained experimentally or derived empirically. Control words specifying a desired rear wheel steering angle are periodically transferred by the central processing unit 52 through the input/output control circuit 55 to a control valve control circuit 57 which converts it into a drive signal IL* or IR* to the control valve 30. When a failure occurs in the steering control system, the central processing unit 51 produces a command which is fed through the input/output control circuit 55 to a cutoff valve control circuit 58 which thereby interrupts the drive signal IF to close the cutoff valve 25 and also another command which is fed through the input/output control circuit 55 to an alarm lamp drive circuit 59 which thereby activates an alarm lamp 45 to provide a visual indication that a failure occurs in the steering control system.

Figure 3:
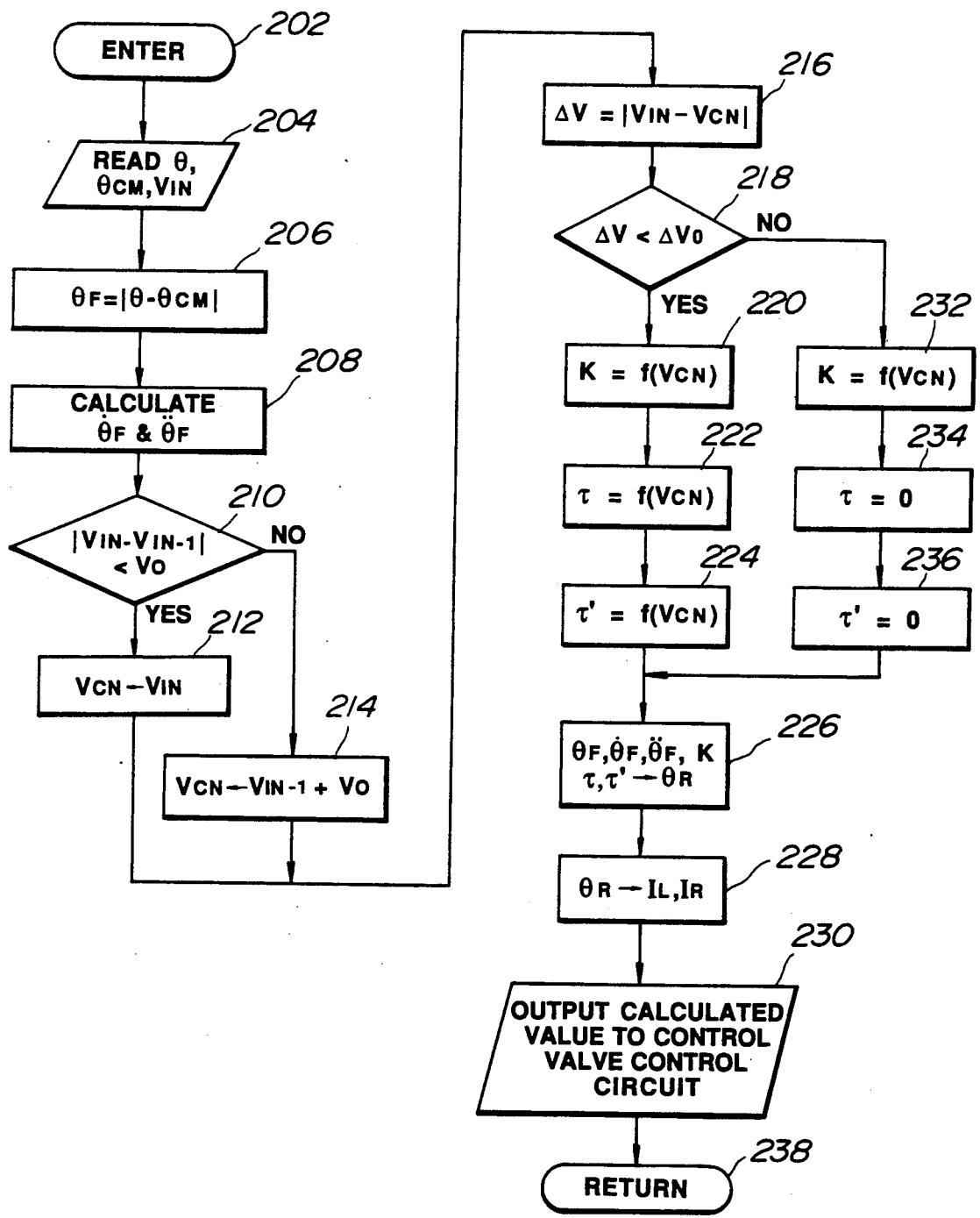
FIG. 3 is a flow diagram showing the programming of the digital computer used in the control unit.

FIG. 3 is a flow diagram illustrating the programming of the digital computer. The computer program is entered at the point 202. At the point 204 in the program, the central processing unit 51 reads the steering wheel position $\theta$, the estimated steering wheel neutral position $\theta CM$ and the vehicle speed VIN. The estimation of the steering wheel neutral position $\theta CM$ is like that disclosed in greater detail in Japanese Patent Application Ser. Nos. 1-120884, 1-120885 and 1-120886 and which are hereby incorporated by reference.

At the point 206 in the program, the central processing unit 51 calculates a front wheel steering angle $\theta F$ by subtracting the estimated steering wheel neutral position $\theta CM$ from the steering wheel position $\theta$. In this case, the front wheel steering angle $\theta F$ is represented as $\theta F = |\theta - \theta CM|$. At the point 208 in the program, the central processing unit 51 calculates a front wheel steering angular speed $\theta F$ ($=d\theta F/dt$) by differentiating the front wheel steering angle $\theta F$ an a front wheel steering angular acceleration $\theta F$ ($=d\theta F/dt$) by differentiating the front wheel steering angular speed $\theta F$. At the point 210 in the program, a determination is made as to whether or not the vehicle speed change is less than a reference value Vo. For this determination, the central processing unit 51 calculates a difference between the new vehicle speed value VIN read in this cycle of execution of the program and the last vehicle speed value VIN−1 read in the last cycle of execution of the program and compares the absolute value |VIN—VIN−1− with the reference value Vo. If the answer to this question is "yes", then the program proceeds to the point 212 where the central processing unit 51 sets the new vehicle speed value VIN for the control vehicle speed value VCN and then to the point 216. Otherwise, the program proceeds to the point 214 where the sum of the last vehicle speed value VIN−1 and the reference value Vo is set for the control vehicle speed value VCN and then to the point 216. Therefore, the control vehicle speed value VCN is always equal to or less than the reference value Vo plus the last vehicle speed value VIN−1.

At the point 216 in the program, the central processing unit 51 calculates the absolute value ΔV of a difference between the read vehicle speed value VIN and the control vehicle speed value VCN. At the point 218 in the program, a determination is made as to whether or not the calculated absolute value ΔV is less than a reference value ΔVo. If the answer to this question is "yes", then it means that the read vehicle speed value VIN and thus the vehicle speed signal is normal and the program proceeds to the point 220. Otherwise, the read vehicle speed value VIN and thus the vehicle speed signal is abnormal and the program proceeds to the point 232.

Figure 5:
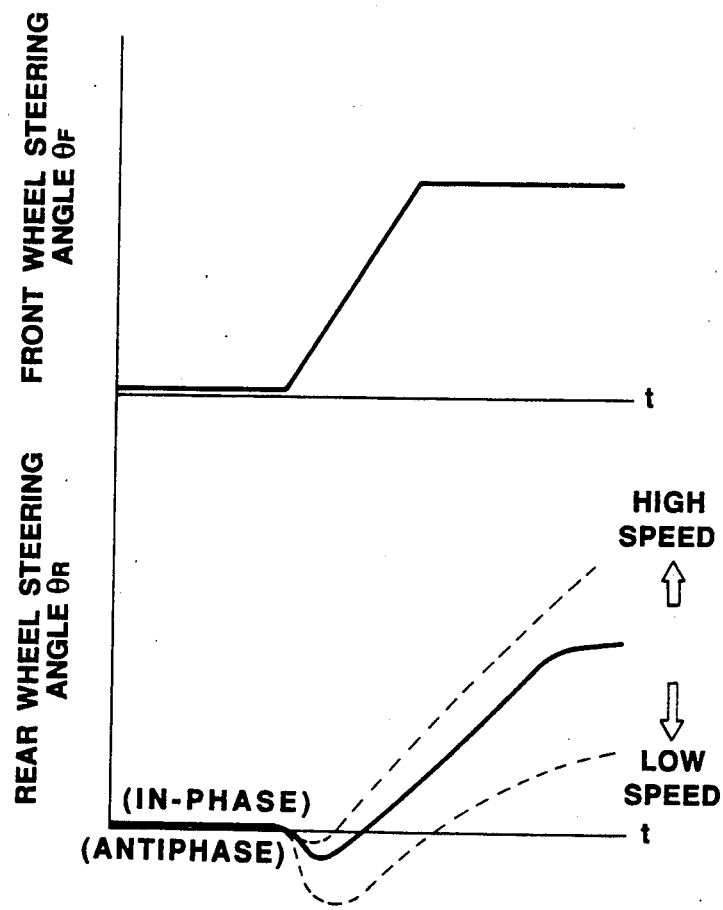
FIG. 5 is a diagram showing front wheel steering angle variations and corresponding rear wheel steering angle variations.

At the point 220 in the program, the central processing unit 51 calculates a first constant K from a relationship which specifies the first constant K as a function of control vehicle speed VCN, as shown in FIG. 5. The calculated first constant K forms an inphase term used in calculating a target value θR for rear wheel steering angle to provide an understeer characteristic to the motor vehicle. At the point 222 in the program, a second constant τ is calculated from a relationship which specifies the second constant as a function of control vehicle speed VCN, as shown in FIG. 5. The calculated second constant τ forms an antiphase term used in calculating a target rear wheel steering angle value θR to provide an oversteer characteristic to the motor vehicle. At the point 224 in the program, a third constant τ' is calculated from a relationship which specifies the third constant τ' as a function of control vehicle speed VCN, as shown in FIG. 5. The calculated third constant τ' forms an antiphase term used in calculating the target rear wheel steering angle value θR to provide an oversteer characteristic to the motor vehicle.

At the point 226 in the program, the central processing unit 51 calculates a target value θR for rear wheel steering angle using the first, second and third constants K, τ, τ' as:

$$\theta R = K \times \theta F + \tau \times \theta F + \theta' \times \theta F$$

At the point 228 in the program, the central processing unit 61 calculates a value IL or IR for the magnitude of the drive signal IL* or IR* supplied to the solenoid 30L or 30R based on the target rear wheel steering angle value θR. At the point 230 in the program, the calculated drive signal magnitude value IL or IR is transferred to the control valve control circuit 57. The control valve control circuit 57 then sets the control valve 30 by producing a drive signal IL* or IR* to the corresponding solenoid 30L or 30R to cause the steering actuator 20 to turn the rear wheels 2L and 2R at an angle calculated by the computer. Following this, the program proceeds to the point 238 where the computer program is returned to the entry point 202.

When the vehicle speed signal is normal, the target rear wheel steering angle value θR is calculated in a manner to provide a first order advance phase inversion control where the rear wheels 2L and 2R are turned for a moment in the direction opposite to the direction in which the front wheel 1L and 1R are turned and then are turned in the same direction as the front wheel steering direction, as shown in FIG. 5. When the rear wheels 2L and 2R are turned in the direction opposite to the front wheel steering direction, a cornering force is applied in the yaw direction so as to decrease the time required for the yaw rate to increase to a sufficient value. After a sufficient yaw rate is obtained, the rear wheels 2L and 2R are turned in the same direction as the front wheel steering direction so as to limit the yaw rate increase and thus decrease the sideslip angle. This is effective to increase the steering operation stability and decrease the steering operation response time. This is true particularly at low and intermediate vehicle speeds.

Figure 4:
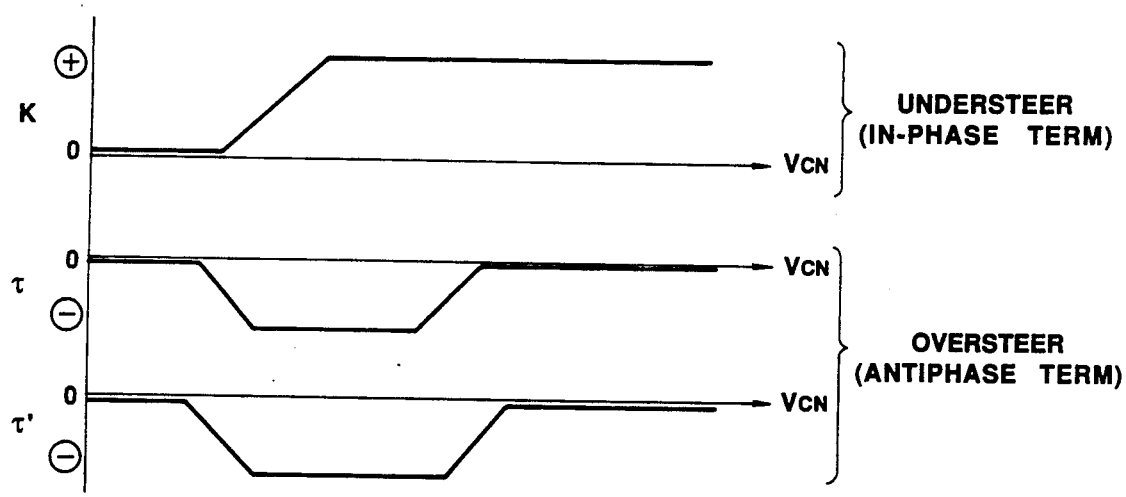
FIG. 4 is a diagram showing relationships specifying constants used in calculating a target value for rear wheel steering angle.

At the point 232 in the program, the central processing unit 51 calculates a first constant K from a relationship which specifies the first constant K as a function of control vehicle speed VCN, as shown in FIG. 4. At the point 222 in the program, the second constant τ is set at zero. At the point 224 in the program, the third constant τ' is set at zero. At the point 226 in the program, the central processing unit 51 calculates a target value θR for rear wheel steering angle using only the first constants K, τ, τ' as:

$$\theta R = K \times \theta F$$

At the point 228 in the program, the central processing unit 51 calculates a value IL or IR for the magnitude of the drive signal IL* or IR* supplied to the solenoid 30L or 30R based on the target rear wheel steering angle value θR. At the point 230 in the program, the calculated drive signal magnitude value IL or IR is transferred to the control valve control circuit 57. The control valve control circuit 57 then sets the control valve 30 by producing a drive signal IL* or IR* to the corresponding solenoid 30L or 30R to cause the steering actuator 20 to turn the rear wheels 2L and 2R at an angle calculated by the computer. Following this, the program proceeds to the point 238 where the computer program is returned to the entry point 202.

Figure 6:
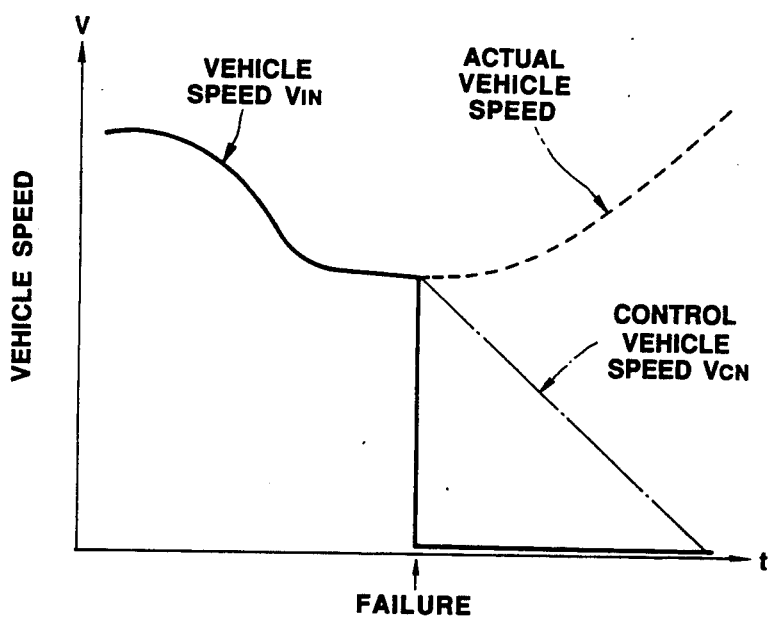
FIG. 6 is a diagram explaining the operation of the auxiliary steering control apparatus of the invention.

When the vehicle speed signal is abnormal; that is, when a failure occurs in the vehicle speed sensor 66 or the circuits associated therewith, the control unit 50 performs an in-phase control where the rear wheels 2L and 2R are steered only in the same direction of steering of the front wheels 1L and 1R. This is effective to ensure safety driving when the vehicle moves in a corner since the vehicle has an understeer characteristic. In addition, the first constant K is a function of the control vehicle speed VCN, the rate of whose change is limited, as shown in FIG. 6. This is effective to avoid a sudden vehicle behavior change after the vehicle speed signal becomes abnormal.

What is claimed is:

1. An auxiliary steering control apparatus for use with a motor vehicle having a steering handle operable to provide a driver's vehicle steering demand, the apparatus comprising:

first sensor means sensitive to a driver's vehicle steering demand;

second sensor means sensitive to a vehicle speed; and
a control unit coupled to the first and second sensor means, the control unit including means for sampling the sensed vehicle speed at time intervals, means for calculating a vehicle speed change between a new value of the sensed vehicle speed and a last value of the sensed vehicle speed, means for calculating a control vehicle speed value which is equal to the new vehicle speed value when the calculated vehicle speed change is less than a limit value and is equal to the last vehicle speed value plus the limit value when the calculated vehicle speed change exceeds the limit value, means for producing a failure signal when a difference between the new vehicle speed value and the control vehicle speed value exceeds a predetermined value, means for performing an auxiliary steering operation to provide an oversteer and understeer characteristic when the vehicle moves in a curve in the absence of the failure signal, means for performing an auxiliary steering operation to provide an understeer characteristic when the vehicle moves in a curve in the presence of the failure signal, means for calculating a front wheel steering angle $\theta F$ based on the sensed driver's vehicle steering demand, means for calculating a first constant K as a function of the control vehicle speed to provide an understeer characteristic to the vehicle, means responsive to the failure signal for calculating a target value $\theta R$ for rear wheel steering angle value as $\theta R = K \times \theta F$, and means for performing the auxiliary steering operation to provide the calculated rear wheel steering angle.

2. An auxiliary steering control apparatus for use with a motor vehicle having a steering handle operable to provide a driver's vehicle steering demand, the apparatus comprising:
first sensor means sensitive to a driver's vehicle steering demand,
second sensor means sensitive to a vehicle speed, and
a control unit coupled to the first and second sensor means, the control unit including:
means for sampling the sensed vehicle speed at time intervals, means for calculating a vehicle speed change between a new value of the sensed vehicle speed and a last value of the sensed vehicle speed;
means for calculating a control vehicle speed value which is equal to the new vehicle value when the calculated vehicle speed change is less than a limit value and is equal to the last vehicle speed value plus the limit value when the calculated vehicle speed change exceeds the limit value;
means for producing a failure signal when a difference between the new vehicle speed value and the control vehicle speed value exceeds a predetermined value;
means for performing an auxiliary steering operation to provide an oversteer and understeer characteristic when the vehicle moves in a curve in the absence of the failure signal;
means for performing an auxiliary steering operation to provide an understeer characteristic when the vehicle moves in a curve in the presence of the failure signal;
means for calculating a front wheel steering angle $\theta F$ based on the sensed driver's vehicle steering demand;
means for calculating a front wheel steering speed $\dot\theta F$ based on the calculated front wheel steering speed $\theta F$;
means for calculating a front wheel steering acceleration $\ddot\theta F$ based on the calculated front wheel steering speed $\dot\theta F$;
means for calculating a first constant K as a function of the control vehicle speed to provide an understeer characteristic to the vehicle, a second constant $\tau$ as a function of the control vehicle speed to provide an oversteer characteristic to the vehicle, and a third constant $\tau'$ as a function of the control vehicle speed to provide an oversteer characteristic to the vehicle;
means for calculating a target value $\theta R$ for rear wheel steering angle as:
$\theta R = K \times \theta F + \tau \times \dot\theta F + \tau' \times \ddot\theta F$ in the absence of the failure signal;
means responsive to the failure signal for calculating a target value $\theta R$ for rear wheel steering angle value as:

$\theta R = K \times \theta F$;

and means for performing the auxiliary steering operation to provide the calculated rear wheel steering angle.

3. An auxiliary steering control apparatus for use with a motor vehicle having a steering handle operable to provide a driver's vehicle steering demand, the apparatus comprising:
first sensor means sensitive to a driver's vehicle steering demand;
second sensor means sensitive to a vehicle speed; and
a control unit coupled to the first and second sensor means, the control unit including means for sampling the sensed vehicle speed at time intervals, means for calculating a vehicle speed change between a new value of the sensed vehicle speed and a last value of the sensed vehicle speed, means for calculating a control vehicle speed value which is equal to the new vehicle speed value when the calculated vehicle speed change is less than a limit value and is equal to the last vehicle speed value plus a predetermined value when the calculated vehicle speed change exceeds the limit value, means for producing a failure signal when the calculated vehicle speed change exceeds the limit value, means for performing an auxiliary steering operation to provide an oversteer and understeer characteristic when the vehicle moves in a curve in the absence of the failure signal, means for performing an auxiliary steering operation to provide an understeer characteristic when the vehicle moves in a curve in the presence of the failure signal, means for calculating a front wheel steering angle $\theta F$ based on the sensed driver's vehicle steering demand, means for calculating a first constant K as a function of the control vehicle speed to provide an understeer characteristic to the vehicle, and means responsive to the failure signal for calculating a target value $\theta R$ for the rear wheel steering angle value as $\theta R = K \times \theta F$, and means for performing the auxiliary steering operation to provide the calculated rear wheel steering angle.

4. The auxiliary steering control apparatus as claimed in claim 3, wherein the predetermined value is equal to the limit value.

5. The auxiliary steering control apparatus as claimed in claim 3, wherein the control unit includes:
- means for calculating a front wheel steering angle $\theta F$ based on the sensed driver's vehicle steering demand;
- means for calculating a front wheel steering speed $\dot{\theta}F$ based on the calculated front wheel steering angle $\theta F$;
- means for calculating a front wheel steering acceleration $\ddot{\theta}F$ based on the calculated front wheel steering speed $\dot{\theta}F$;
- means for calculating a first constant K as a function of the control vehicle speed to provide an understeer characteristic to the vehicle, a second constant $\tau$ as a function of the control vehicle speed to provide an oversteer characteristic to the vehicle, and a third constant $\tau'$ as a function of the control vehicle speed to provide an oversteer characteristic to the vehicle; and
- means for calculating a target value $\theta R$ for rear wheel steering angle as:

$$\theta R = K \times \theta F + \tau \times \dot{\theta}F + \tau' \times \ddot{\theta}F$$

in the absence of the failure signal.

6. An auxiliary steering control apparatus for use with a motor vehicle having a steering handle operable to provide a driver's vehicle steering demand, the apparatus comprising:
- first sensor means sensitive to a driver's vehicle steering demand;
- second sensor means sensitive to a vehicle speed; and
- a control unit coupled to the first and second sensor means, the control unit including means for sampling the sensed vehicle speed at time intervals, means for calculating a vehicle speed change between a new value of the sensed vehicle speed and a last value of the sensed vehicle speed, means for calculating a control vehicle speed value which is equal to the new vehicle speed value when the calculated vehicle speed change is less than a limit value and is equal to the last vehicle speed value plus the limit value when the calculated vehicle speed change exceeds the limit value, means for producing a failure signal when a difference between the new vehicle speed value and the control vehicle speed value exceeds predetermined value, means for performing an auxiliary steering operation to provide an oversteer and understeer characteristic when the vehicle moves in a curve in the absence of the failure signal, means for calculating a front wheel steering angle $\theta F$ based on the sensed driver's vehicle steering demand when the vehicle moves in a curve in the presence of the failure signal, means responsive to the calculated front wheel steering angle for determining a target value $\theta F$ for rear wheel steering angle when the vehicle moves in a curve in the presence of the failure signal, and means for performing an auxiliary steering operation to provide the determined target value for rear wheel steering angle when the vehicle moves in a curve in the presence of the failure signal.

7. An auxiliary steering control apparatus for use with a motor vehicle having a steering handle operable to provide a driver's vehicle steering demand, the apparatus comprising:
- first sensor means sensitive to a driver's vehicle steering demand;
- second sensor means sensitive to a vehicle speed; and
- a control unit coupled to the first and second sensor means, the control unit including means for sampling the sensed vehicle speed at time intervals, means for calculating a vehicle speed change between a new value of the sensed vehicle speed and a last value of the sensed vehicle speed, means for calculating a control vehicle speed value which is equal to the new vehicle speed value when the calculated vehicle speed changes is less than a limit value and is equal to the last vehicle speed value plus the limit value when the calculated vehicle speed change exceeds the limit value, means for producing a failure signal when a difference between the new vehicle speed value and the control vehicle speed value exceeds a predetermined value, means for performing an auxiliary steering operation to provide an oversteer and understeer characteristic when the vehicle moves in a curve in the absence of the failure signal, means for calculating a front wheel steering angle $\theta F$ based on the sensed driver's vehicle steering demand when the vehicle moves in a curve in the presence of the failure signal, means for calculating a target value $\theta R$ for rear wheel steering angle as a function of the control vehicle speed and the calculated front wheel steering angle when the vehicle moves in a curve in the presence of the failure signal, and means for performing an auxiliary steering operation to provide the calculated target value for rear wheel steering angle when the vehicle moves in a curve in the presence of the failure signal.

* * * * *